(No Model.) 2 Sheets—Sheet 1.
M. E. SLOCUM.
VELOCIPEDE.
No. 481,070. Patented Aug. 16, 1892.
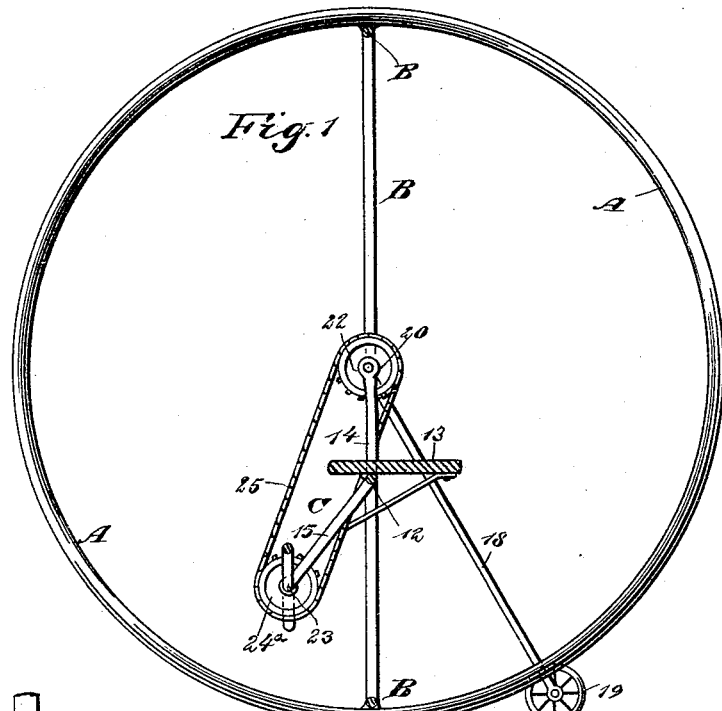
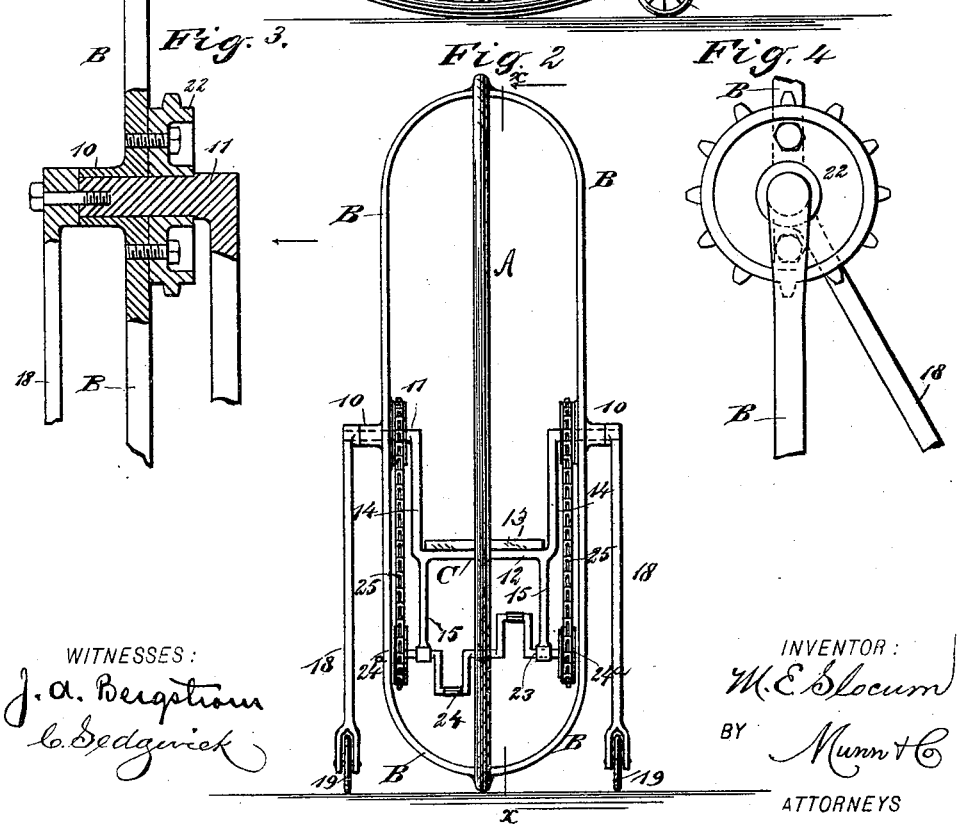
WITNESSES:
J. A. Bergstrom
C. Sedgwick
INVENTOR:
M. E. Slocum
BY Munn & Co.
ATTORNEYS (No Model.) 2 Sheets—Sheet 2.
M. E. SLOCUM.
VELOCIPEDE.
No. 481,070. Patented Aug. 16, 1892.
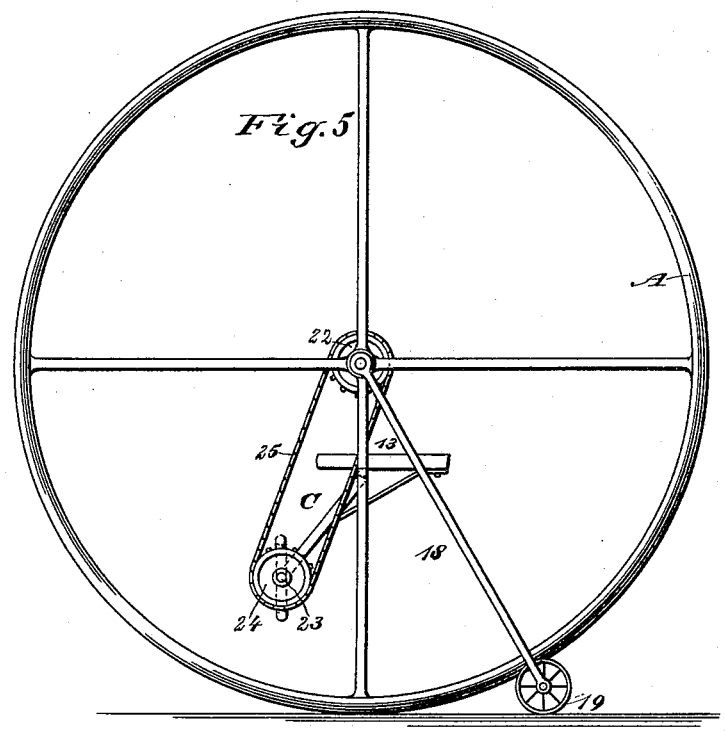
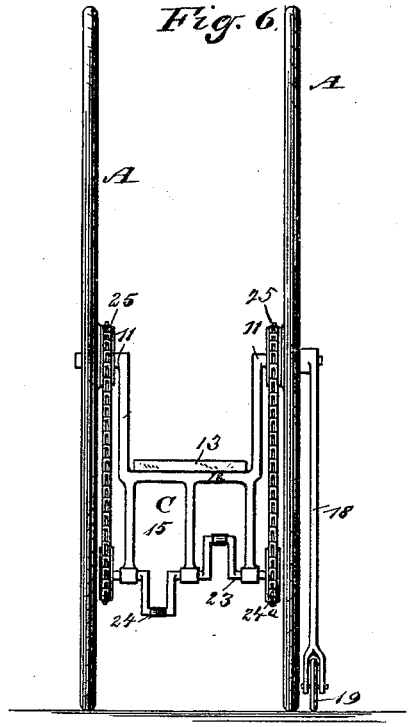
WITNESSES:
J. A. Bergstrom
C. Sedgwick
INVENTOR:
M. E. Slocum
BY Munn & Co.
ATTORNEYS

UNITED STATES PATENT OFFICE.

MARTHA ELLEN SLOCUM, OF MEADVILLE, PENNSYLVANIA.

VELOCIPEDE.

SPECIFICATION forming part of Letters Patent No. 481,070, dated August 16, 1892.

Application filed February 27, 1892. Serial No. 423,068. (No model.)

*To all whom it may concern:*

Be it known that I, MARTHA ELLEN SLOCUM, of Meadville, in the county of Crawford and State of Pennsylvania, have invented a new and useful Improvement in Bicycles and Unicycles, of which the following is a full, clear, and exact description.

My invention relates to an improvement in that class of velocipedes known as "unicycles" and "bicycles," and has for its object to provide a vehicle wherein a person can ride with ease and with perfect safety, and also to so construct the vehicles that brace and brake wheels may be used in connection with the main wheel or wheels.

Another object of the invention is to provide a vehicle of the type above referred to which shall be simple, durable, and economic in its construction.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a central vertical section through a unicycle constructed in accordance with my invention, the section being taken practically on the line $x\,x$ of Fig. 2. Fig. 2 is a front elevation of the vehicle. Fig. 3 is a detail sectional view through the frame, a portion of the seat-support, and the mechanism carrying the brace and brake wheels. Fig. 4 is a side elevation of the mechanism shown in Fig. 3. Fig. 5 is a side elevation of the improvement as applied to a bicycle, and Fig. 6 is a front elevation of the bicycle.

In the construction of the unicycle the wheel consists of a large ring or tire A, the said wheel being without spokes or a hub; but the wheel is braced and strengthened through the medium of a frame B, which frame comprises arched bars, one located at each side, the said bars being located diagonally opposite and attached at their ends to the tire or ring in any suitable or approved manner. In constructing the frame the bars are curved at their extremities, only those portions intermediate of the ends being straight, as shown in Fig. 2. Each bar of the wheel-supporting frame at its center is provided with a hub 10, extending through its outer face. In these hubs the horizontal arms 11 of a seat-frame C are journaled. The seat-frame comprises, mainly, a horizontal body 12, as shown in Fig. 2, upon which the seat 13 is secured, vertical arms 14 projecting upward from the body to a connection with the horizontal arms 11, and arms 15 are projected downward from the body of the frame, preferably in an inward diagonal position, one at each side of the body, as shown in Figs. 1 and 2. The upper horizontal arms of the seat-frame are solid, as shown in Fig. 3, and these arms have secured rigidly to their outer ends rods or bars 18, carrying at their lower extremities wheels 19, adapted to serve as brake and brace wheels for the vehicle. A sprocket-wheel 22 is loosely mounted upon each arm 11 of the seat-frame C, as is best shown in Fig. 3, and these sprocket-wheels are rigidly attached to the inner face of the members or bars constituting the wheel-supporting frame B.

In the lower arms 15 of the seat-supporting frame a crank-shaft 23 is journaled, the said shaft being provided with two crank-arms extending in opposite directions, which crank-arms carry pedals 24, of any approved construction, and the crank-shaft extends beyond the outer sides of the arms 15, in which it is journaled, the projecting ends of the shaft having secured thereon sprocket-wheels $24^a$, connected by belts 25 with the upper sprocket-wheels 22, attached to the supporting-frame of the wheel. The bars 18, being located one at each side of the main wheel and its frame and outside of the latter, serve as braces therefor, maintaining the vehicle in an upright position. The bars 18, however, may be manipulated in any approved manner to raise the wheels from the ground—as, for instance, when a high rate of speed is to be maintained. The preferable way of raising the bars 18 from the ground is for the rider to cause the seat 13 to incline upward at its rear edge. The bar or bars 18 and the seat are rigidly connected through the arms 11 14, and hence when the seat is horizontal, as in Figs. 1 and 5, the wheels 19 will contact with the ground; but when the operator tilts the seat and raises the rear edge thereof the arms 18 will also swing upward and lift the wheels 19. Thus the rider has complete control of the machine, and all mechanisms for raising the arms 18 and their wheels are dispensed with.

This vehicle is exceedingly simple, durable, and economic in its construction, and it is apparent that it may be used with perfect safety by the most timid person.

In applying the device to a bicycle in which two wheels A are employed both wheels are of equal size and are arranged side by side a suitable distance apart, and the chair and chair-frame are located between the wheels in like manner, as has been heretofore described in connection with the unicycle. As there is no wheel-supporting frame employed in the bicycle, spokes are used in the wheels and also a hub, the upper horizontal arms of the chair-supporting frame being journaled in the hubs of the wheels, and the sprocket-wheels 22 are secured to the inner faces of the wheels around their hubs, In connection with the bicycle but one brace or brake rod is preferably employed, and it is located at one side, as shown in Fig. 6, and may be raised or lowered by an attached handle or a lever of any description; but if in practice it is found desirable a brace and brake wheel may be located back of the seat between the main wheels.

Having thus described my invention, I claim as new and desire to secure by Letters Patent—

1. The combination, with the depending seat-frame having outwardly-projecting arms at its upper end, on which the wheel-hubs are journaled, and the operating mechanism, of the arm or arms 18, rigidly mounted at their upper ends on said outwardly-projecting arms and inclined rearward and downward to a point adjacent to the ground-line, substantially as set forth.

2. The combination, in a velocipede, with the seat-frame having a horizontal seat, vertical arms at the ends thereof, horizontal arms projecting outward from the upper ends of said vertical arms through wheel-hubs, sprocket-wheels on the wheel-hubs, arms 15, projecting downward and forward from the seat-frame and carrying the treadles provided with sprocket-wheels, and chains connecting the wheel and treadle sprockets, of the rods or bars rigidly secured to the said horizontal arms and extending downward and rearward therefrom and provided with wheels at the ground-line, substantially as set forth.

MARTHA ELLEN SLOCUM.

Witnesses:
C. R. SLOCUM,
MILES W. TATE.